UNITED STATES PATENT OFFICE.

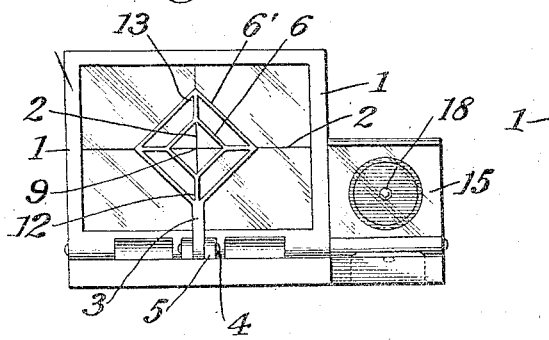
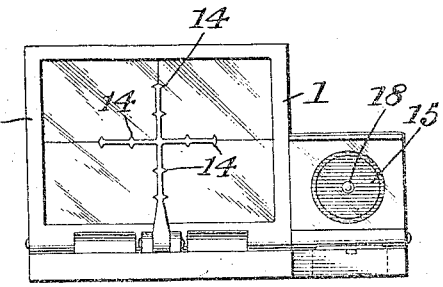
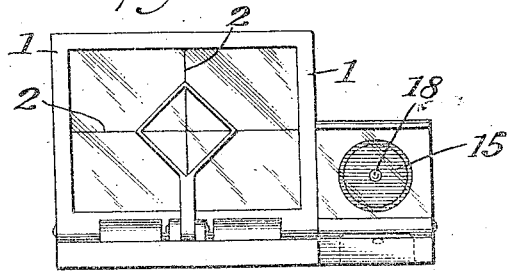
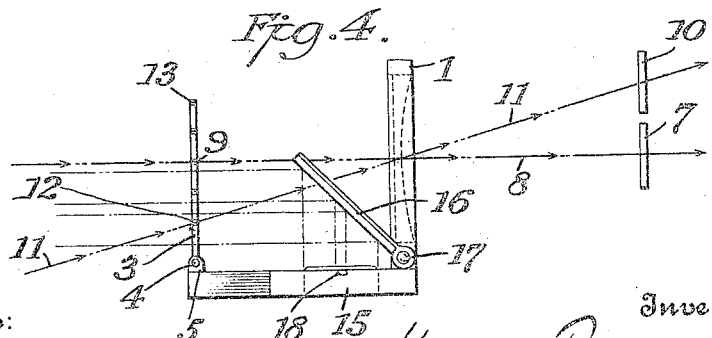

STANLEY BROWN, OF GARDEN CITY, NEW YORK.

DIRECT-VIEW FINDER FOR CAMERAS.

1,140,108.　　　　Specification of Letters Patent.　　Patented May 18, 1915.

Application filed January 20, 1915. Serial No. 3,217.

*To all whom it may concern:*

Be it known that I, STANLEY BROWN, a citizen of the United States, and a resident of the city of Garden City, county of Nassau, and State of New York, have invented certain new and useful Improvements in Direct-View Finders for Cameras, of which the following is a specification.

It is the purpose of this invention to so construct the sighting piece, or so-called "sight" of a direct view finder, that observations made through it in conjunction with the crossing wires, lines or markings upon the co-acting reducing lens or screen of the finder, the lens of the camera being correspondingly adjusted, may more accurately effect the desired location of the subject to be photographed upon the field of the plate or film, thus compensating for any offsetting of the subject relative to a horizontal line through the center of the lens.

Referring to the drawings, Figure 1 is an elevation of the sight member of a direct view finder embodying the invention; Figs. 2 and 3 are views similar to Fig. 1 of modified constructions; Fig. 4 is a sidewise elevation of the complete finder, showing the operation of the apparatus diagrammatically and also showing the preferred construction of level which I use in conjunction with my improved sight.

The drawings hereof show three forms in which the invention may be constructed, but they are examples merely. Other forms may be substituted.

In the drawings 1 is a frame the same as usually employed for the support of the crossing wires or lines 2, 2, which determine the axis of the finder. It is preferably hinged at its lower edge. 3 is the sight member of the finder. It is preferably pivoted at 4 to some suitable support 5, so that it may be folded downwardly over the face of the support and in turn covered by the frame 1, thus being protected. In Fig. 1 the sight member is shown as composed of two concentric parallelograms 6 and 6' respectively. They center upon the center of the finder as determined by the intersecting lines 2, 2.

If the subject to be photographed is in direct horizontal line with the finder when the camera is horizontal, then the view through the sight member will be in the center of the inner parallelogram and will be coincident with the intersection of the crossing lines or wires 2, 2. This is illustrated in Fig. 4, where 7 is the subject supposed to be in horizontal line with the axis of the camera and the direct view is indicated by the line 8 taken through the center of the sight member as indicated at 9 in Figs. 1 and 4. If, on the other hand, the subject to be photographed is offset above the horizontal line through the axis of the camera, as indicated at 10 in Fig. 4, then the sight through the direct view finder will be taken on the line 11, through the lower corner 12 of the sight member or the corner immediately above, as shown in Figs. 1 and 4, intersecting the crossing lines or wires on the screen as before.

Similarly, if the subject to be photographed were below the horizontal line through the camera, then the upper corner 13 or the one immediately below would be utilized as the sight and will be brought into coincidence with the intersecting lines or wires of the screen. If the exposure be made with the camera on its side, then of course the fixed sight points which in the drawing appear on the horizontal, will then become the upper and lower sight points and will be used as above described.

In Fig. 2 practically the same construction is embodied excepting instead of having continuous sided parallelograms the corners or view points thereof are determined by points or projections 14 upon a cross like member, as shown. The description above given of the operation of the apparatus illustrated in Fig. 1 applies to that of Fig. 2 without further elaboration.

In Fig. 3 the sight member is shown substantially as in Fig. 1, excepting that a single concentric parallelogram only is employed, somewhat larger in size than the smaller one shown in Fig. 1.

In order to secure the level or horizontal position of the camera as a preliminary requisite to the adjustment of the lens and the making of the exposure, I prefer to employ a level of some sort in conjunction with my improved finder. The form preferred by me is illustrated in the drawings hereof, that is to say, mounted preferably upon the same base as the sight member, or at least so assembled with the finder as to be conveniently usable therewith, I provide a level 15 which I prefer shall be of the circular variety and provided with a mirror 16 (see Fig. 4) which is preferably hinged as at 17 so as to fold down when not in use over the level and thus protect it against fracture. The level will of course be provided with the usual shot, bubble or similar feature or element 18 and I prefer to hinge or pivot the level in some suitable manner to adapt it to use in both the horizontal and vertical positions of the camera.

It will of course be understood by those familiar with such matters that the camera will be furnished with a movable lens provided with indices which shall coincide with the divergence from the horizontal indicated by the sight points upon the sight member referred to above. It will also be obvious, as stated above, that the forms of the invention described and illustrated are examples merely of many forms in which the invention may be embodied and they may be departed from and yet the essentials of the invention be retained. I therefore do not limit myself to such details.

I claim:

1. In a direct view finder, crossing devices, a support therefor and a sight member provided with a series of fixed sight points whereby the divergence of the subject from the axis of the camera may be determined.

2. A direct view finder provided with a level and having crossing devices, a support therefor and a sight member provided with a series of fixed sight points whereby the divergence of the subject from the axis of the camera may be determined.

3. In combination with a camera having a movable lens, a direct view finder having crossing devices, a support therefor and a sight member provided with a series of fixed sight points whereby the divergence of the subject from the axis of the camera may be determined for the adjustment of the lens.

In testimony whereof I have signed my name to this specification in the presence of two subscribing witnesses.

STANLEY BROWN.

Witnesses:
T. M. DONSBACH,
CORNELIUS P. MCLAUGHLIN.